United States Patent
Zeis et al.

(10) Patent No.: US 8,387,054 B1
(45) Date of Patent: Feb. 26, 2013

(54) METHOD AND APPARATUS OF SCHEDULING DATA MOVERS

(75) Inventors: Michael Zeis, Minneapolis, MN (US); Stephan Kurt Gipp, Inver Grove Heights, MN (US); Claudia Rudolph, Medina, MN (US)

(73) Assignee: Symantec Corporation, Mountain View, CA (US)

( * ) Notice: Subject to any disclaimer, the term of this patent is extended or adjusted under 35 U.S.C. 154(b) by 1114 days.

(21) Appl. No.: 11/864,853

(22) Filed: Sep. 28, 2007

(51) Int. Cl.
*G06F 9/46* (2006.01)
*G06F 15/173* (2006.01)

(52) U.S. Cl. ......... 718/102; 718/104; 718/105; 709/226

(58) Field of Classification Search .............. 718/1–105; 709/223–226; 707/640–660; 711/161, 162
See application file for complete search history.

(56) References Cited

U.S. PATENT DOCUMENTS

| | | | |
|---|---|---|---|
| 5,774,668 A * | 6/1998 | Choquier et al. | 709/223 |
| 6,092,178 A * | 7/2000 | Jindal et al. | 712/27 |
| 6,393,458 B1 | 5/2002 | Gigliotti et al. | |
| 6,795,858 B1 | 9/2004 | Jain et al. | |
| 7,533,385 B1 * | 5/2009 | Barnes | 718/104 |
| 8,051,171 B2 * | 11/2011 | Batni et al. | 709/226 |
| 2002/0152310 A1 * | 10/2002 | Jain et al. | 709/226 |
| 2004/0205206 A1 * | 10/2004 | Naik et al. | 709/230 |

* cited by examiner

*Primary Examiner* — Abdullah Al Kawsar
(74) *Attorney, Agent, or Firm* — Campbell Stephenson LLP

(57) ABSTRACT

A method and apparatus for scheduling data movers is described. The method and apparatus comprise monitoring utilization of a resource used by a data mover to process a data flow, determining rank information based on the utilization of the resource and scheduling a task according to the rank information.

19 Claims, 3 Drawing Sheets

METHOD AND APPARATUS OF SCHEDULING DATA MOVERS

BACKGROUND OF THE INVENTION

1. Field of the Invention

Embodiments of the present invention generally relate to storage systems, more particularly, to method and apparatus for scheduling data movers in a data storage system.

2. Description of the Related Art

A data storage system, generally, includes a plurality of data movers and an array of physical disk drives (e.g., ATA disks, fibre channel disks, a tape library and any other data storage device). A data mover, in any type of data storage system, refers to the function (e.g., process) that is able to push or pull (e.g., send or receive, respectively) data over a communication interface or port to or from various computing environments (e.g., various platforms, protocols, systems and the like). Data movers, generally, include data transfer systems, devices and/or software that utilize the capabilities of the data storage system (e.g., data backup, duplication and/or recovery systems) to quickly and reliably move data from one location (e.g., a client computer, a database and the like) to another location (e.g., tape library, disk drives and the like). For example, the data movers read data from one data storage device) and transfer the data to another data storage device.

The data mover may be an abstract machine running on a media server and serving as an interface for a master server in the storage system. For example, the data mover is an instance of middleware (e.g., software comprising a collection of algorithms for communicating data for a variety of applications, such as data backup, recovery and duplication tasks) executed by the media server.

In a multi-node distributed data protection system (e.g., multiple data movers, backup libraries, media servers and the like), a large number of concurrent and/or successive backup, restore or duplication tasks must be initiated and executed optimally (e.g., in the shortest time period possible or with a minimal amount of involvement from the master server). In this multi-node distributed data protection, a plurality of data movers of various capabilities perform the backup, duplication and/or restore tasks. Occasionally, the data movers are non-optimally scheduled and the data protection system suffers from overloaded or underutilized data movers. As a result, backup, duplication or restore tasks are not completed or completed non-optimally (e.g., a significant amount of time to perform the tasks).

Therefore, there is a need in the art for a method and apparatus for scheduling data movers in order to optimally perform backup, duplication or restore tasks.

SUMMARY OF THE INVENTION

Embodiments of the present invention generally comprise a method and apparatus for scheduling data movers. In one embodiment, the method and apparatus comprise monitoring utilization of a resource used by a data mover to process a data flow, determining rank information based on the utilization of the resource and scheduling a task according to the rank information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one", and the word "plurality" means one or more, unless otherwise mentioned.

DETAILED DESCRIPTION

Figure 1:
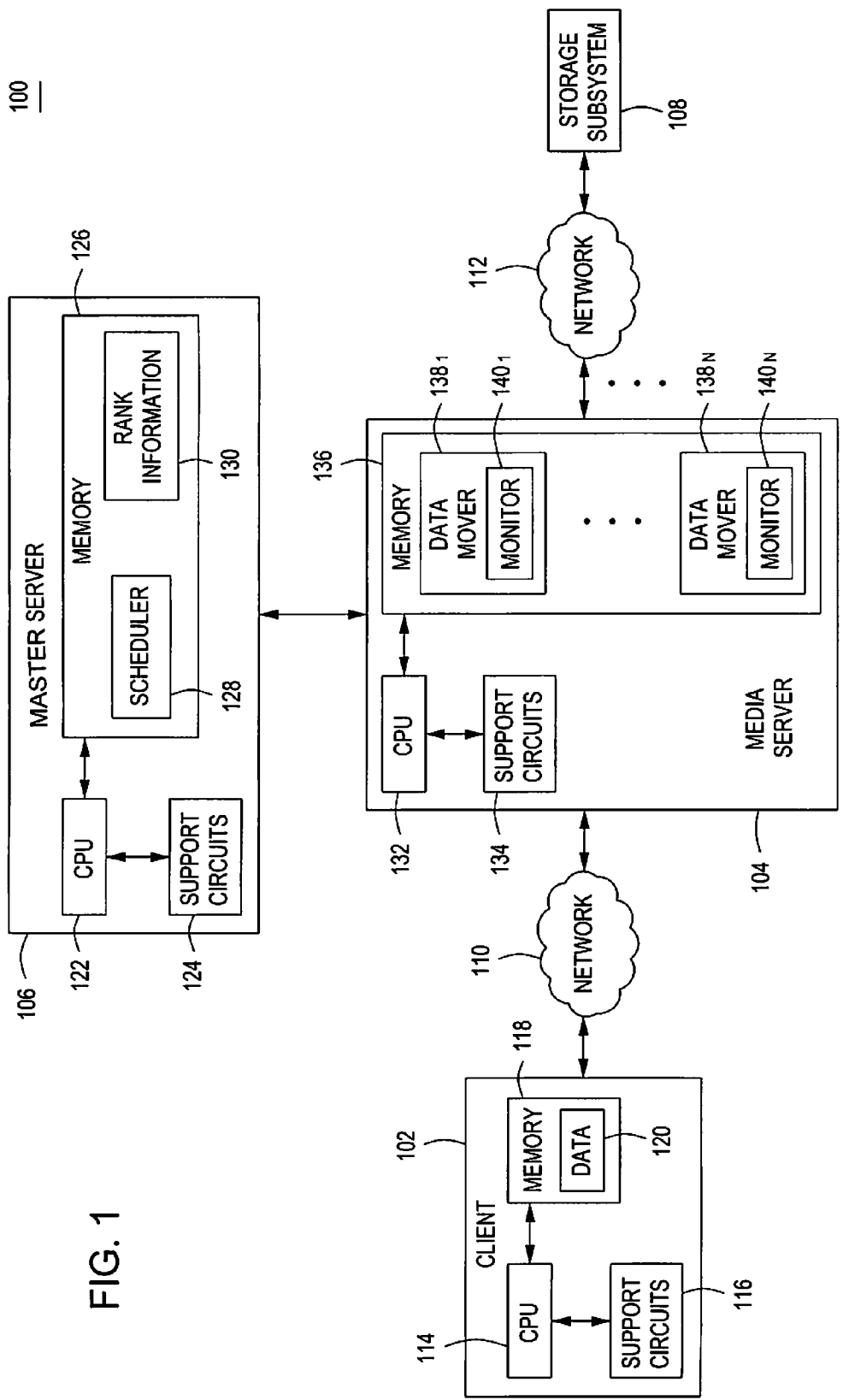
FIG. 1 is a block diagram of a system for scheduling data movers according to one embodiment.

FIG. 1 is a block diagram of a system 100 in accordance with one or more embodiments of the present invention. The system 100 includes a client 102, a media server 104, a master server 106 and a storage subsystem 108. The client 102 is coupled to the media server 104 through a network 110. The media server 104 is coupled with the storage subsystem 108 through a network 112. It is well understood that although FIG. 1 illustratively refers to one client 102 and one media server 104, various embodiments of the present invention may include more than one client 102 and/or media server 104.

The client 102 may be any type of networked computing device, data storage device or database requiring data protection (e.g., backup, duplication or restore). The client 102 includes a central processing unit (CPU) 114, various support circuits 116 and memory 118. The CPU 114 may comprise one or more commercially available microprocessors or microcontrollers that facilitate data processing and storage. Various support circuits 116 facilitate operation of the CPU 114 and may include clock circuits, power supplies, input/output circuits and/or the like. The memory 118 includes a read only memory, random access memory, disk drive storage, optical storage, removable storage, and the like. The memory 118 includes data 120 requiring data protection (e.g., backup, duplicate or restore).

The media server 104 is any computing device that simply stores and shares media. The media server 104 includes a central processing unit (CPU) 132, various support circuits 134 and a memory 136. The CPU 132 may comprise one or more commercially available microprocessors or microcontrollers that facilitate data processing and storage. Various support circuits 134 facilitate operation of the CPU 132 and may include clock circuits, power supplies, input/output circuits and/or the like. The memory 136 includes a read only memory, random access memory, disk drive storage, optical storage, removable storage, and the like. The memory 136 further includes various software packages, such as data movers 138 (illustrated as a data mover $138_1$ ... a data mover $138_N$).

The media server 104 manages the backup, duplication and restore tasks of the client 102 (e.g., remote clients) to directly attached or network-attached storage within the storage subsystem 108 (e.g., tape, optical disk and the like). In one embodiment, the media server 104 enables Local Area Network (LAN)-free data protection.

In one embodiment, the media server 104 executes software within the memory 136 in order to create instances of the data movers 138. In another embodiment, the data movers 138 are physical devices with embedded software for performing the data protection tasks of the master server 106. In such an embodiment, the data movers 138 route data from the client 102 to an appropriate volume (e.g., a coupled volume) within the storage subsystem 108.

The master server 106 is a computing device that manages (e.g., schedules) other components in any data protection system (e.g., the media server 104, the storage subsystem 108, various embodiments of the data movers 138, such as software and hardware data movers). The master server 106 includes a central processing unit (CPU) 122, various support circuits 124 and a memory 126. The CPU 122 may comprise one or more commercially available microprocessors or microcontrollers that facilitate data processing and storage. Various support circuits 124 facilitate operation of the CPU 122 and may include clock circuits, power supplies, input/output circuits and/or the like. The memory 126 includes a read only memory, random access memory, disk drive storage, optical storage, removable storage, and the like. The memory 126 further includes various software packages, such as a scheduler 128 and rank information 130. The rank information 130 comprises a collection of rank information communicated from each of the data movers 138.

Generally, the storage subsystem 108 is a collection of data storage technologies (e.g., tape library, ATA disk arrays, Fibre Channel disk arrays, (SCSI (Internet SCSI) block devices and the like). The storage subsystem 108 includes a plurality of storage volumes for storing data for data protection tasks (e.g., backup, duplicate or restore). In one embodiment, specific volumes within the storage subsystem 108 are coupled to specific ones of the data movers 138 and store data primarily from such data movers.

The network 110 comprises a communication system that connects a computer system by wire, cable, fiber optic, and/or wireless links facilitated by various types of well-known network elements, such as hubs, switches, routers, and the like. The network 110 may employ various well-known protocols to communicate information amongst the network resources. For example, the network 110 may be part of the Internet or intranet using various communications infrastructure such as Ethernet, WiFi, WiMax, GPRS, and the like.

Similarly, the network 112 also comprises a communication system that connects a computer system by wire, cable, fiber optic, and/or wireless links facilitated by various types of well-known network elements, such as hubs, switches, routers, and the like. The network 112 may be a Storage Area Network (SAN) comprising a Fibre channel switches and/or ISCI block storage devices.

The data movers 138, generally, are abstract processes running on the media server 104 and serving as an interface for the master server 106 in order to process (e.g., move) data backed up to or restored from the storage subsystem 108. Each data mover includes a monitor 140 (illustrated as a monitor $140_1$ ... a monitor $140_N$) for analyzing the utilization of one or more resources (e.g., processors, memory, network components and the like) used by each data mover to process a flow of data from the client 102 to the storage subsystem 108 (e.g., perform backup, duplication and/or restore tasks).

Such an analysis enables each of the monitors 140 to determine a capacity or an ability to perform additional data protection tasks for each data mover. In one embodiment, each of the monitors 140 determines a data transfer rate (e.g., an aggregate data transfer rate) from each of the data movers 138 to the storage subsystem 108. The active data protections tasks performed by each of the data movers 138 periodically report their physical 1/0 transfer rate (bytes per second) to the monitors 140. In another embodiment, each of the monitors 140 determines a response time for each of the data movers 138 to complete an assigned (e.g., scheduled) and active data protection task. The response time (e.g., an aggregate response time) of the active tasks of each of the data movers 138 is collected by the each of the monitors 140 using a feedback mechanism. As additional data protection tasks are scheduled (e.g., by the scheduler 128) to an initially idle data mover, the data transfer rate and/or the response time will start to increase. Once the data transfer rate and/or the response time decreases, such a reduction is reflected in the rank information for that data mover and communicated to the master server 106 to update (e.g., adjust) the rank information 130. Accordingly, that data movers is utilized more often and the rank information is reduced (e.g., eventually the rank information is null or zero indicating).

Based on such information, the monitors 140 determine (e.g., compute) rank information for each of the data movers 138. In one embodiment, the monitors 140 compute the rank information based on either a number of active tasks (e.g., data protection and other tasks, such as third-party initiated tasks) divided by a number of processors, an amount of available memory, the aggregate response time for the active tasks or the aggregate data transfer rate. In yet another embodiment, the monitors 140 are configured to adjust the rank information if there is any change in either the response time for performing any of active data protection tasks, the utilization of one or more resources or the data transfer rate. Each of the monitors 140 communicates (e.g., asynchronously) the rank information of each of the data movers 140 after each adjustment to the master server 106 for scheduling or provisioning additional data protection tasks.

According to one or more embodiments, the scheduler 128 provisions (e.g., schedules) a new data protection task by selecting an optimal data mover machine (e.g., denoted by rank information) for a new data protection task (e.g., backup, duplicate or restore task) within the system 100. In one embodiment, the scheduler 128 measures (e.g., estimates) an amount of resources (e.g., number of processors, amount of memory, processing time and the like) necessary to perform the data protection task in order to determine which of the data movers 138 is best suited to be provisioned the data protection task. In one embodiment, the scheduler 128 compares the estimated amount of resources to a capacity of available resources at each of the data movers 138 (e.g., denoted by rank information 130).

The monitors 140 periodically reassign rank information to each of the data movers 138. The rank information 130 indicates a current capability of each of the data movers 138 to handle a flow of data as part of the data-protection task. In one embodiment, the higher the rank information of any of the data mover 138, the more capable to handle an additional data protection task. The scheduler 128 selects the data mover of the highest rank information among the data movers 138 in the system 100 (e.g., data protection pool) that are candidates for performing the current data protection task. In one embodiment, a data mover of the data movers 140 having the fewest number of active tasks is scheduled (e.g., in the event of a tie between at least two data movers).

Alternatively, the scheduler 128 queries the data movers 138 for a current state each and every time a new data protection task is to be provisioned (e.g., assigned). In another embodiment, the scheduler 128 tracks the response times of the completed tasks to measure each of the data movers 138 capability to complete an additional data protection task.

Various embodiments of the present invention reduce the workload of the master server 106 (e.g., the scheduler 128). Accordingly, the scheduler 128 is able to optimally schedule a significant number of the data movers 138 in real-time. Since the scheduler 128 will choose the highest ranked data mover, the tasks within the data protection pool are distributed to the data movers currently capable of optimally performing the additional data protection tasks. In one embodiment, the scheduler 128 optimally handles a non-homogeneous multi-node system (i.e. class of systems or nodes are not the same) where the class is not known.

Figure 2:
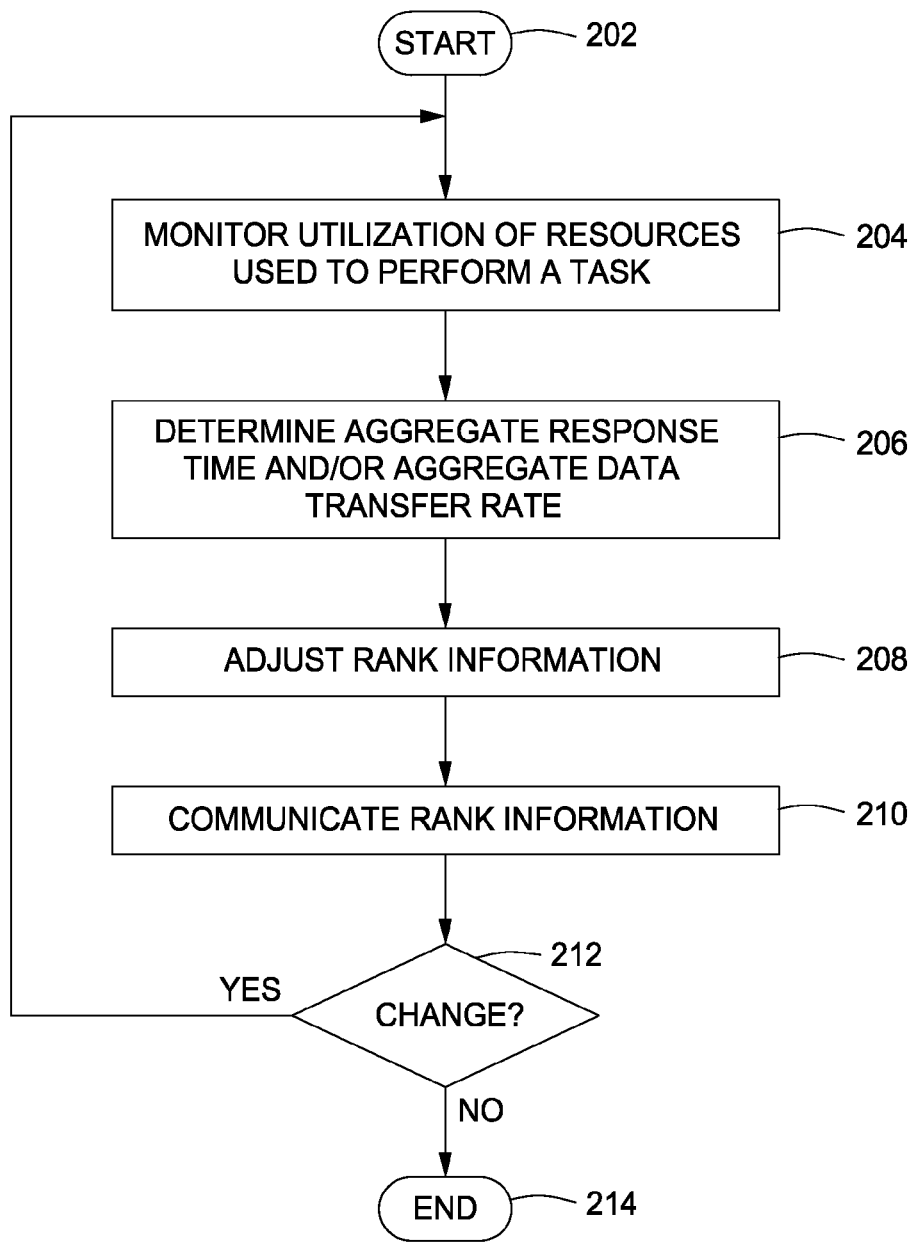
FIG. 2 is a flow diagram of a method of determining rank information according to one embodiment.

FIG. 2 is a flow diagram illustrating a method 200 for determining rank information. The method 200 begins at step 202 and proceeds to step 204. At step 204, utilization of one or more resources used by a data mover to perform a data protection task is monitored. In one embodiment, a monitor coupled to the data mover (e.g., any of the monitors 140) analyzes the utilization of various processors, memory devices and/or networking components used to process a data flow to one or more volumes in a storage subsystem. Accordingly, the utilization of one or more resources indicates a capacity or ability of the data mover to perform an additional data protection task.

At step 206, an aggregate response time and/or an aggregate data transfer rate of active data protection tasks is determined. As described above, the aggregate response time and/or aggregate data transfer rate is determined based on the utilization of the resources and feedback generated during the performance of the active data protection tasks. At step 208, rank information for the data mover is adjusted. The adjustment is based on the utilization of the one or more resources, the aggregate response time or the aggregate data transfer rate. At step 210, the rank information is communicated to a master server to be used for scheduling additional data protection tasks amongst a plurality of data movers.

At step 212, a determination is made as to whether the aggregate response time and/or the aggregate data transfer rate has changed. In one embodiment, the aggregate response time or the aggregate data transfer rate may change if the data mover is performing non-data protection tasks and/or recently scheduled data protection tasks. If the aggregate response time or the aggregate data transfer rate has changed, the method 200 returns to step 206. If the aggregate response time or the aggregate data transfer rate has not changed, the method 200 proceeds to step 214. At step 214, the method 200 ends.

Figure 3:
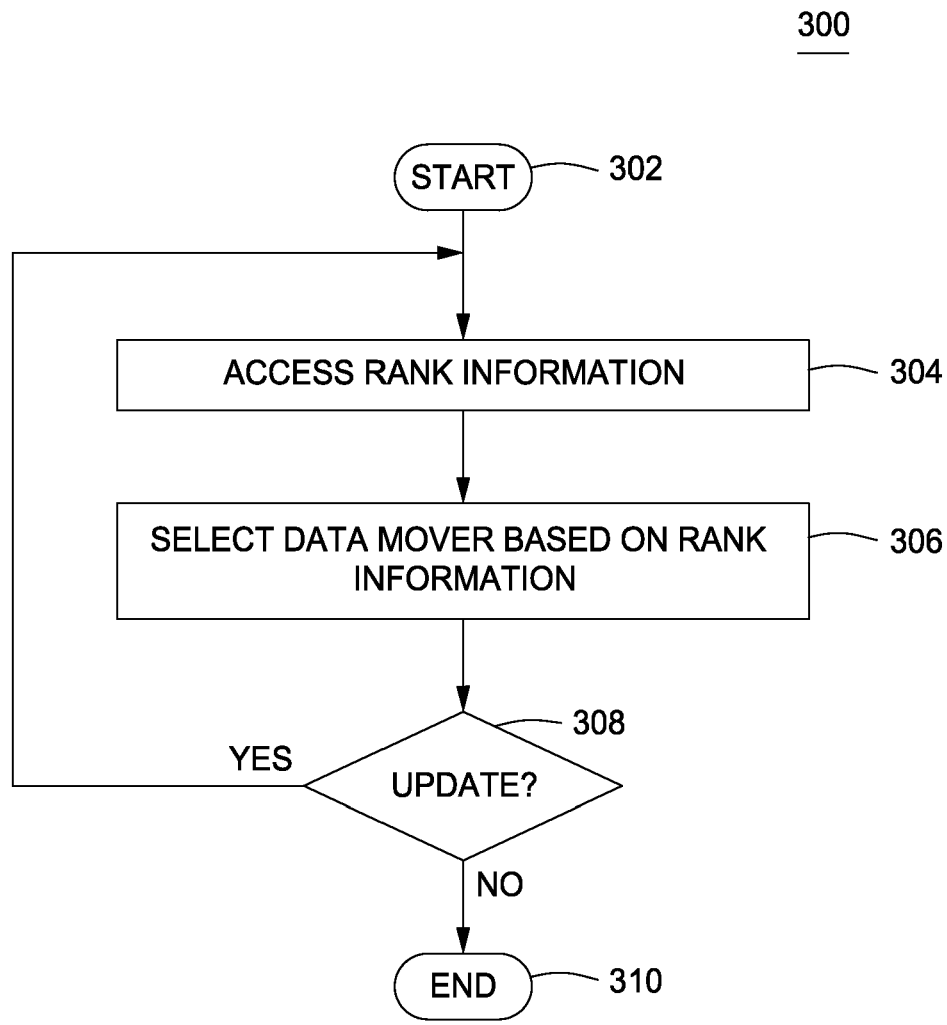
FIG. 3 is a flow diagram of a method of scheduling a data mover to perform a data protection task according to one embodiment.

FIG. 3 is a flow diagram illustrating a method 300 for scheduling a data protection task. The method 300 begins at step 302 and proceeds to step 304. At step 304, rank information is accessed by a scheduler (e.g., the scheduler 128 accesses the rank information 130 stored on the master server 106). At step 306, a data mover is selected based on the rank information at the master server. At step 308, a determination is made as to whether the rank information at the master server has been updated with recent adjusted rank information communicated by a monitor within each data mover (e.g., the monitors 140). If the rank information has been updated, the method 300 returns to step 304. In one embodiment, the data protection task is rescheduled or assigned to a more optimal data mover based on the updated rank information. If the rank information has not been updated, the method 300 proceeds to schedule a plurality of data movers based on the rank information. At step 310, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
receiving at a master server rank information from a media server, wherein the media server comprises a plurality of data movers,
each data mover of the plurality of data movers is configured to monitor utilization of at least one resource used by the each data mover to process a data flow,
the each data mover of the plurality of data movers is configured to determine an aggregate measure of response time for the each data mover based on a plurality of active data protection tasks,
the rank information is calculated by the each data mover based upon the utilization of the at least one resource used by the each data mover to process the data flow and the aggregated measure of response time for the each data mover based on the plurality of active data protection tasks in response to detecting a change in the utilization of the at least one resource and a change in the aggregated response time,
the each data mover of the plurality of data movers asynchronously transmits the rank information to the master server in response to the detecting the change in utilization of the at least one resource and the change in the aggregated response time, and
processing the data flow is part of a first data protection task;
storing the rank information at the master server as part of a list, wherein
the list represents a collection of rank information received from the each data mover of the plurality of data movers;
selecting a selected data mover from the plurality of data movers according to the rank information;
in response to the selecting, scheduling the selected data mover to perform a second data protection task; and
receiving at the master server updated rank information from the media server, wherein
the each data mover of the plurality of data movers calculates the updated rank information in response to the scheduling, and
the updated rank information is based on the change in the utilization of the at least one resource and the change in the aggregated response time.

2. The method of claim 1, wherein the selecting comprises:
estimating an amount of resources to perform a data protection task; and
comparing the amount with a capacity of available resources at each of the plurality of data movers.

3. The method of claim 1, further comprising:
determining a response time to process the data flow.

4. The method of claim 1, further comprising:
determining a data transfer rate for the data mover.

5. The method of claim 1, further comprising:
analyzing utilization of each resource used by the each data mover of the plurality of data movers to perform a plurality of data protection tasks.

6. The method of claim 5, wherein
the selected data mover has the highest rank information of any of the plurality of data movers.

7. The method of claim 5, further comprising:
computing the rank information for each of the plurality of data movers based on at least one of a number of active tasks divided by a number of processors, an amount of available memory, a response time for the active tasks, and a data transfer rate.

8. The method of claim 5, further comprising:
scheduling the plurality of data movers to perform a plurality of tasks based on the rank information for each of the plurality of data movers.

9. The method of claim 1, wherein the second data protection task comprises at least one of a backup task, duplication task, and a restore task.

10. An non-transitory computer readable storage medium storing program instructions executable to:
receive at a master server rank information from a media server, wherein the media server comprises a plurality of data movers,
each of the plurality of data movers is configured to monitor utilization of at least one resource used by the each data mover to process a data flow,
each of the plurality of data movers is configured to determine an aggregate measure of response time for the each data mover based on a plurality of active data protection tasks,
the rank information is calculated by the each data mover based upon the utilization of the at least one resource used by the each data mover to process the data flow and the aggregated measure of response time for the each data mover based on the plurality of active data protection tasks in response to detecting a change in the utilization of the at least one resource and a change in the aggregated response time,
the each data mover of the plurality of data movers asynchronously transmits the rank information to the master server in response to the detecting the change in utilization of the at least one resource and the change in the aggregated response time, and
processing the data flow is part of a first data protection task;
store the rank information at a master server as part of a list, wherein
the list represents a collection of rank information received from the each data mover of the plurality of data movers;
select a selected data mover from the plurality of data movers according to the rank information;
schedule the selected data mover to perform a second data protection task, in response to selecting the data mover; and
receive updated rank information from the media server, wherein
the each data mover of the plurality of data movers calculates the updated rank information in response to the scheduling, and
the updated rank information is based on the change in the utilization of the at least one resource and the change in the aggregated response time.

11. The non-transitory computer readable storage medium of claim 10, wherein the selected data mover has the highest rank information of any of the plurality of data movers.

12. The non-transitory computer readable storage medium of claim 10, wherein the selected data mover has a fewest number of active tasks.

13. The non-transitory computer readable storage medium of claim 10, wherein the rank information is adjusted for the each data mover based on a change in at least one of a response time for active tasks or a data transfer rate.

14. The non-transitory computer readable storage medium of claim 13, wherein the rank information is communicated to the master server after the rank information has been adjusted for the data mover.

15. The non-transitory computer readable storage medium of claim 10, wherein the instructions are further executable to:
query the plurality of data movers for the rank information.

16. A system comprising:
a master server comprising:
a memory for storing rank information for a data mover,
a scheduler for
receiving at the master server the rank information from a media server, wherein the media server comprises the plurality of data movers,
each data mover of the plurality of data movers is configured to monitor utilization of at least one resource used by the each data mover to process a data flow,
the each data mover of the plurality of data movers is configured to determine an aggregate measure of response time for the each data mover based on a plurality of active data protection tasks,
the rank information is calculated by the each data mover based upon the utilization of the at least one resource used by the each data mover to process the data flow and the aggregated measure of response time for the each data mover based on the plurality of active data protection tasks in response to detecting a change in the utilization of the at least one resource and a change in the aggregated response time,
the each data mover of the plurality of data movers asynchronously transmits the rank information to the master server in response to the detecting the change in utilization of the at least one resource and the change in the aggregated response time, and
processing the data flow is part of a first data protection task; storing the rank information at the master server as part of a list, wherein the list represents a collection of rank information from the each data mover of
the plurality of data movers;
selecting the data mover from the plurality of data movers according to the rank information;
scheduling a selected data mover to perform a second data protection task, in response to selecting the selected data mover; and
receiving at the master server updated rank information from the media server, wherein
the each data mover of the plurality of data movers calculates the updated rank information in response to the scheduling, and the updated rank information is based on the change in the utilization of the at least one resource and the change in the aggregated response time.

17. The system of claim 16, further comprising:
a storage subsystem comprising:
   a plurality of volumes, wherein the each data mover performs at least one of a backup task, duplication task, and a restore task between at least one volume and at least one client.

18. The system of claim 16, wherein the selected data mover has the highest rank information of any of the plurality of data movers.

19. The system of claim 16, wherein the scheduler reschedules the second data protection task based on a change in the rank information.

* * * * *